US006413045B1

(12) United States Patent
Dancer et al.

(10) Patent No.: US 6,413,045 B1
(45) Date of Patent: Jul. 2, 2002

(54) TURBINE BLADES

(75) Inventors: Stephen N Dancer; Alec G Dodd, both of Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/610,113

(22) Filed: Jul. 5, 2000

(30) Foreign Application Priority Data

Jul. 6, 1999 (GB) ............................................. 9915648

(51) Int. Cl.⁷ ................................................ F01D 11/08
(52) U.S. Cl. ..................................... 415/173.6; 415/228
(58) Field of Search ................................ 415/189, 191, 415/192, 195, 914, 173.6, 173.1, 228

(56) References Cited

U.S. PATENT DOCUMENTS

| 2,918,254 A | 12/1959 | Hausammann |
| 4,677,828 A | 7/1987 | Matthews |
| 5,215,439 A | 6/1993 | Jansen |
| 5,466,123 A | 11/1995 | Rose |
| 5,482,435 A | * 1/1996 | Dorris et al. ............. 416/97 R |
| 6,146,098 A | * 11/2000 | Fukuno et al. ............ 416/97 R |

FOREIGN PATENT DOCUMENTS

| EP | 56047603 AB | 4/1981 |
| GB | 1605 335 P2 | 12/1991 |
| GB | 2245 034 B1 | 12/1991 |
| GB | 2298 245 B1 | 8/1996 |
| WO | WO 98/59157 P2 | 12/1998 |

* cited by examiner

*Primary Examiner*—Edward K. Look
*Assistant Examiner*—Richard Edgar
(74) *Attorney, Agent, or Firm*—W. Warren Taltavull; Manelli, Denison & Selter PLLC

(57) ABSTRACT

The shroud (26) of a shrouded turbine blade (22) has a convex leading edge (30) the apex of which extends towards the trailing edge of the shroud (24) of an adjacent, preceding guide vane. The extension enables the containment of a reverse flow of high pressure gas from the juncture of the blade aerofoil and shroud, until the pressure has dropped sufficiently to avoid nullifying gas flow from the corresponding portion of the guide vane (20) and thereby reduces excessive hot gas leakage from between the opposing shrouds edges.

4 Claims, 1 Drawing Sheet

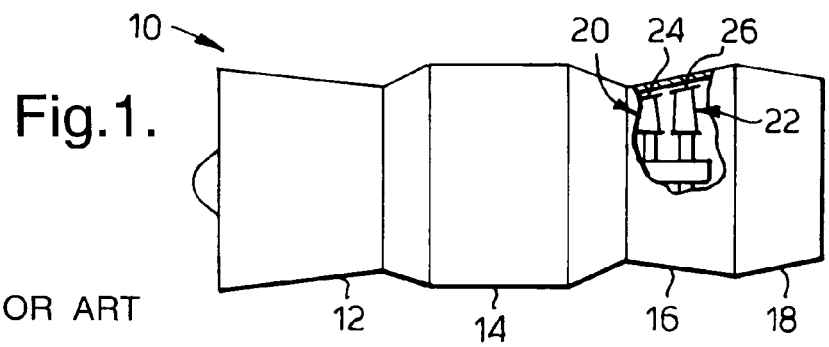
Fig. 1.
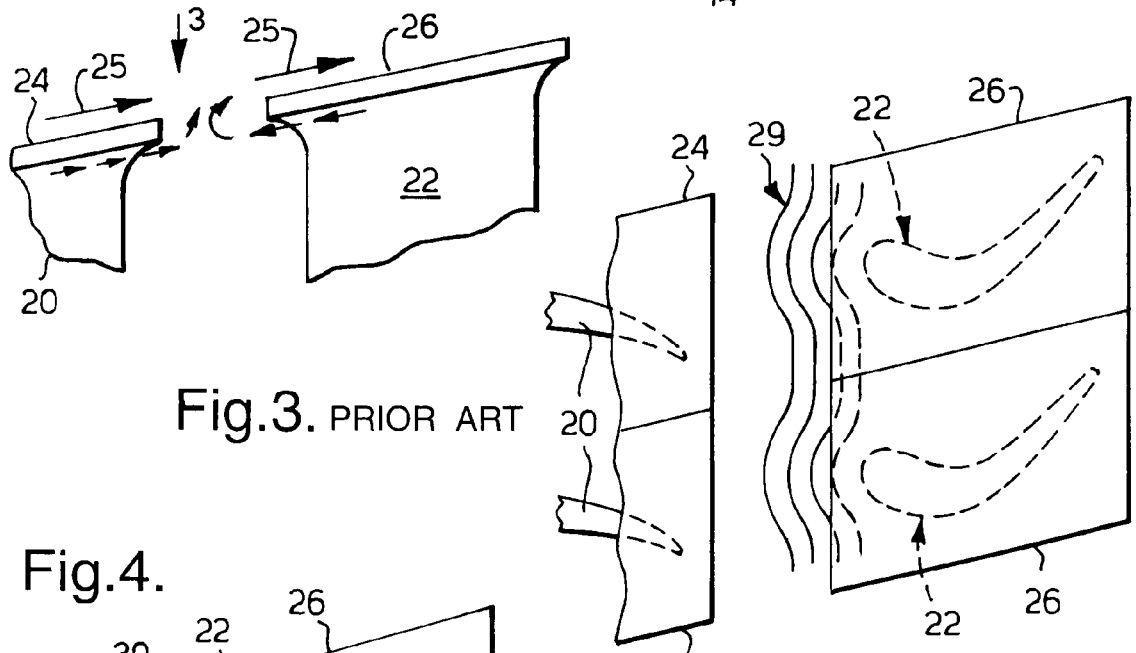
Fig. 2. PRIOR ART
Fig. 3. PRIOR ART
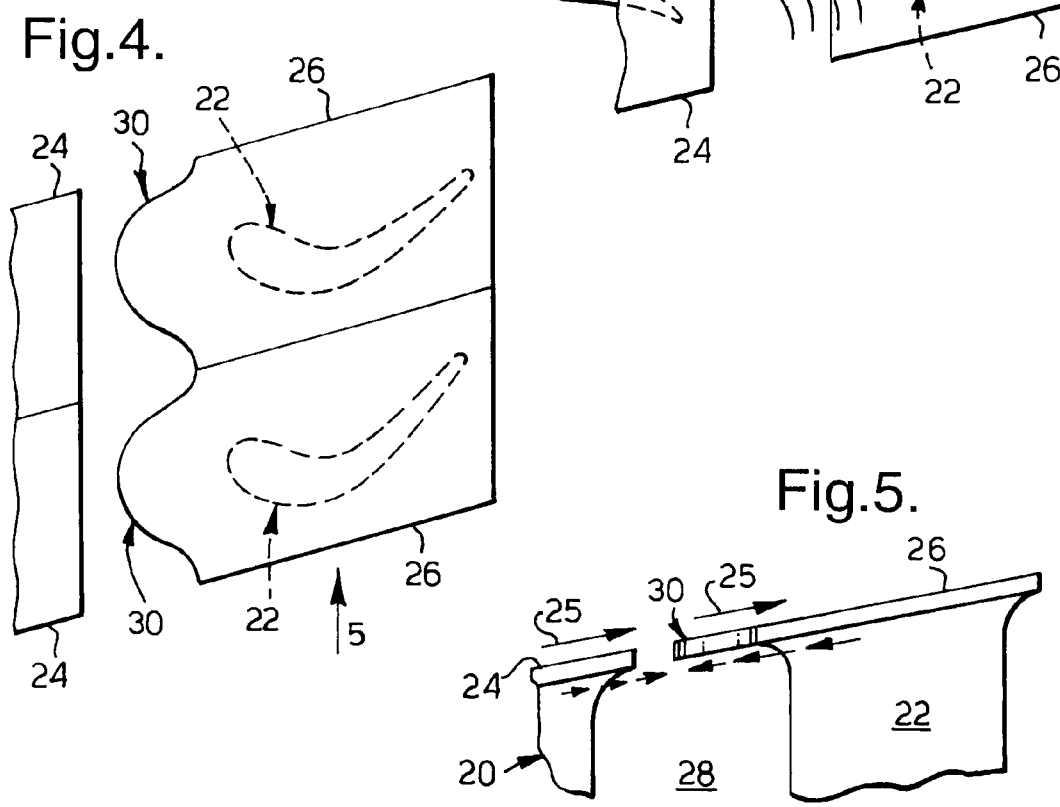
Fig. 4.
Fig. 5.

TURBINE BLADES

FIELD OF THE INVENTION

The present invention relates to shrouded turbine blades of the kind used in gas turbine engines. The invention has particular efficacy if used in gas turbine engines of the kind used to power aircraft.

BACKGROUND OF THE INVENTION

During the operation of a gas turbine engine, combustion gases pass through a stage of guide vanes, and are directed thereby on to a rotary stage of turbine blades in a known manner. The stage of blades is thus rotated and, via connecting shafting, in turn, rotate a compressor and/or fan.

The side edges of the shrouds of the turbine blades are sealed one to the other, in known manner, by means which allows the blades to move away laterally from each other, under the influence of, inter alia, centrifugal forces, without producing gaps through which gases would escape. However, axial spaces must be provided between the downstream edges of shrouds surrounding the stage of guide vanes, and the upstream edges of the turbine blades shrouds, so as to avoid friction between the static and rotating stages.

During operational rotation of the stage of turbine blades, the rotational loads exerted on the gas flow, added to by the friction between the gas and the juncture of the blades aerofoil portions and their respective shroud under surfaces, causes the generation of a volume of relatively high pressure gas, which radiates outwardly of the blades surfaces, in directions other than in a downstream direction, but mainly in a direction forwardly of the blades leading edges, ie upstream, in the form of a jet. The force of the jet, under some operating regimes of an associated engine is sufficient to overcome the force of the gas leaving the corresponding area on the guide vanes, ie the juncture of their aerofoils and shrouds, in a downstream direction. There results an outwardly turned flow of gases through the gap between the guide vanes and turbine, which flow then reverses, to flow over the exterior of the turbine blade shrouds.

SUMMARY OF THE INVENTION

The present invention seeks to provide a shrouded turbine blade having improved gas flow control.

According to the present invention, a turbine blade comprises an aerofoil having a shroud on its radially outer end with respect to an axis of operation thereof, the leading edge of said shroud being locally shaped so as to at least substantially contain local gas flow which extends in directions other than downstream during in situ operation of said turbine blade in a gas turbine engine.

BRIEF DESCRIPTION OF THE DRAWINGS

The invention will now be described, by way of example and with reference to FIGS. 1, 4 and 5 of the accompany drawings in which:

FIG. 1 is a diagrammatic view of a gas turbine engine incorporating shrouded guide vanes and shrouded turbine blades positioned in known manner, with or without the features of the present invention.

FIG. 2 is an enlarged part view of a co-operating guide vane and prior art shrouded turbine blade.

FIG. 3 is a view in the direction of arrow 3 in FIG. 2.

FIG. 4 is as FIG. 3 but of a shrouded turbine blade including an example of the present invention, and FIG. 5 is a view in the direction of arrow 5 in FIG. 4.

DETAILED DESCRIPTION OF THE INVENTION

Referring to FIG. 1. A gas turbine engine 10 has a compressor 12, combustion equipment 14, a turbine section 16, and an exhaust nozzle 18, all of which are arranged in flow series.

The turbine stage 16 comprises a stage of non-rotatable guide vanes 20, followed in the said flow series by a rotatable stage of turbine blades 22, which are spaced from the stage of guide vanes 20, in a direction axially of the engine 10. Each vane 20 and blade 22 is provided with a respective shroud 24 and 26, which together, form axial portions of the outer wall of the gas annulus 28.

Referring now to FIG. 2, which is an illustration of a drawback experienced during use of prior art turbine blades 22, in conjunction with guide vanes 20.

During rotational operation of the turbine blades 22, friction between the gas and blades aerofoils and shrouds underside surfaces causes local slowing of the gas flow in those regions. There results a build up of pressure in the slowed gas flow at the juncture of the respective blades aerofoils and shrouds, which develops into a flow which radiates outwardly, around the leading edge of each blade, in directions laterally and forwardly thereof. The maximum pressure in the radiated flow is in that portion of the gas which flows off the leading edge of each blade, in a direction upstream, ie a reversed flow, relative to the main flow through the turbine. Brief references to FIG. 3 shows the pressure pattern 29 in the slowed gas flow as having a pseudo sinewave form, which rotates with the turbine stage.

Referring again to FIG. 2. The drawback mentioned hereinbefore, is that the pressure of the reversed gas flow from the leading edges of the blades is so high, that it overcomes the gas flow leaving the corresponding areas of the guide vanes 20, in the opposite direction with the result that both gas flows turn outwardly through the clearance space between their opposing shroud edges, and there, mix with cooling air (arrows 25) which is flowing over the outer surfaces of the blades shrouds 26. The effectiveness of the cooling air is thus degraded with the result that, in prior art turbines, extra cooling air has to be provided, in order to maintain appropriate cooling, and thereby, blade shroud life. However, the use of more air to achieve the required cooling, leaves less air for combustion, and a consequence of this is that the engine efficiency is reduced.

Referring now to FIG. 4. The present invention is exemplified by modifying the leading edge 30 of each turbine blade shroud 26, such that part thereof which is immediately in front of the leading edge of its respective blade, is sufficiently extended as to cover the highest pressure portion of the reversed gas flow, until such time that its pressure has dropped to a value too low to adversely affect the opposing gas flow leaving the corresponding areas of the guide vanes 20. By this means, leakage to the exterior of the turbine is reduced to an acceptable level, and the need for excessive cooling air obviated.

In the example of the present invention as illustrated, the leading edge 30 of each blade shroud 26 is convexly curved, the apex of each curve being closest to the opposing guide vane shroud, and directly in front of the leading edge of its associated blade aerofoil. The remainder of the curve approximately follows the pressure patterns depicted in the FIG. 3 prior art.

Referring to FIG. 5. The reduced pressure, reversed gas flow is represented by the differing sized arrows.

We claim:

1. A shrouded turbine blade for use in a gas turbine device through which gases flow for compression and combustion before exiting the gas turbine device, said blade comprising an aerofoil having a shroud on its radially outer end with respect to an axis of operational rotation thereof, said shroud having a leading edge which in operation creates a pressure pattern of gases flowing over said blade including in advance of said leading edge, said pressure pattern including a region of high pressure and regions at a pressure lower than the high pressure on opposite sides of said high pressure region, said leading edge of said shroud being continuous and a forward portion shaped with a projecting portion including recessed portions on opposite sides of said projecting portion corresponding to low pressure regions in said pressure pattern and with the projecting portion corresponding to a high pressure portion of the pressure pattern relative to an adjacent array of stator vanes to confine a substantial portion of the gas flows which extend from the radially outer leading edge portion of said shroud in directions other than downstream, during in situ operational rotation of the turbine blade, said continuous leading edge of said shroud also being forwardly projected from the leading edge of the blade.

2. A shrouded turbine blade as claimed in claim 1 wherein said forward portion is convex over a major portion of the width extremities of said shroud leading edge, said convex shape being effectively identical with the pressure pattern defined by said gases in the vicinity of said aerofoil leading edge.

3. A turbine disc fitted with shrouded turbine blades as claimed in claim 1.

4. A gas turbine engine provided with a turbine disc fitted with shrouded blades as claimed in claim 1.

* * * * *